May 24, 1949.  E. A. FREDRICKSON  2,470,925
PISTON SEAL FOR FLUSH VALVES
Filed Jan. 16, 1946  2 Sheets-Sheet 2
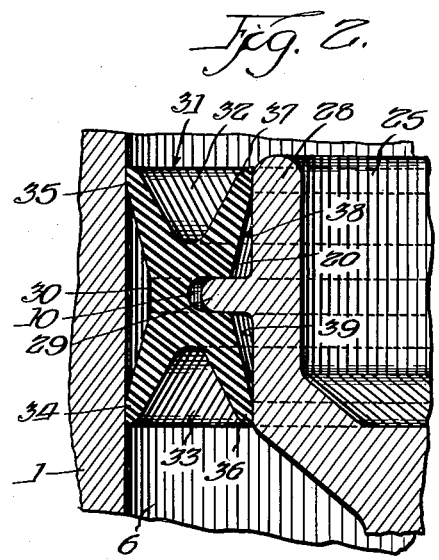
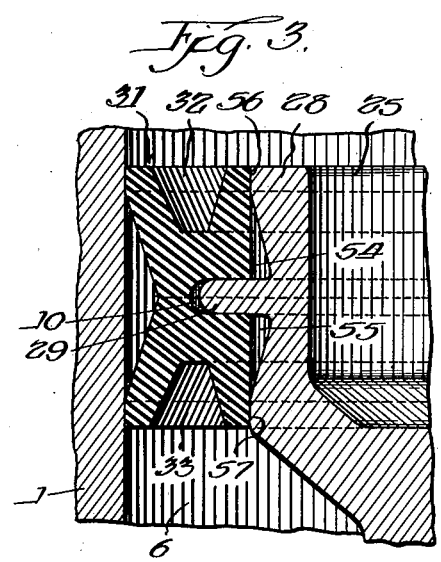
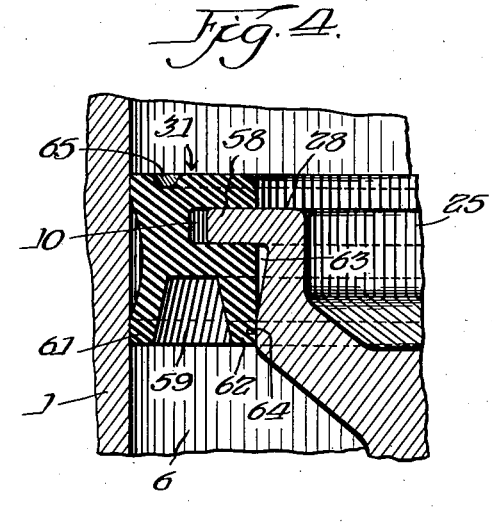
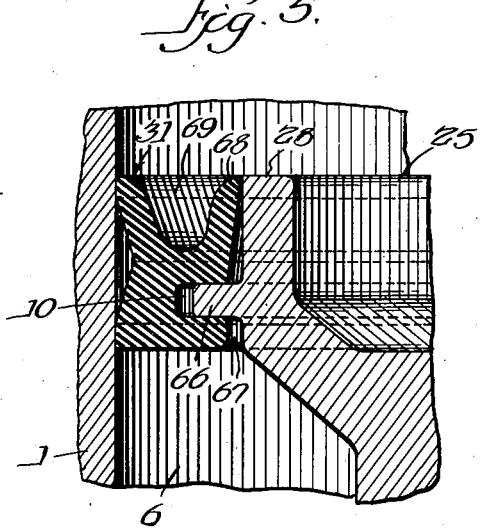
Inventor:
Edward A. Fredrickson
By Joseph O. Lange Atty.

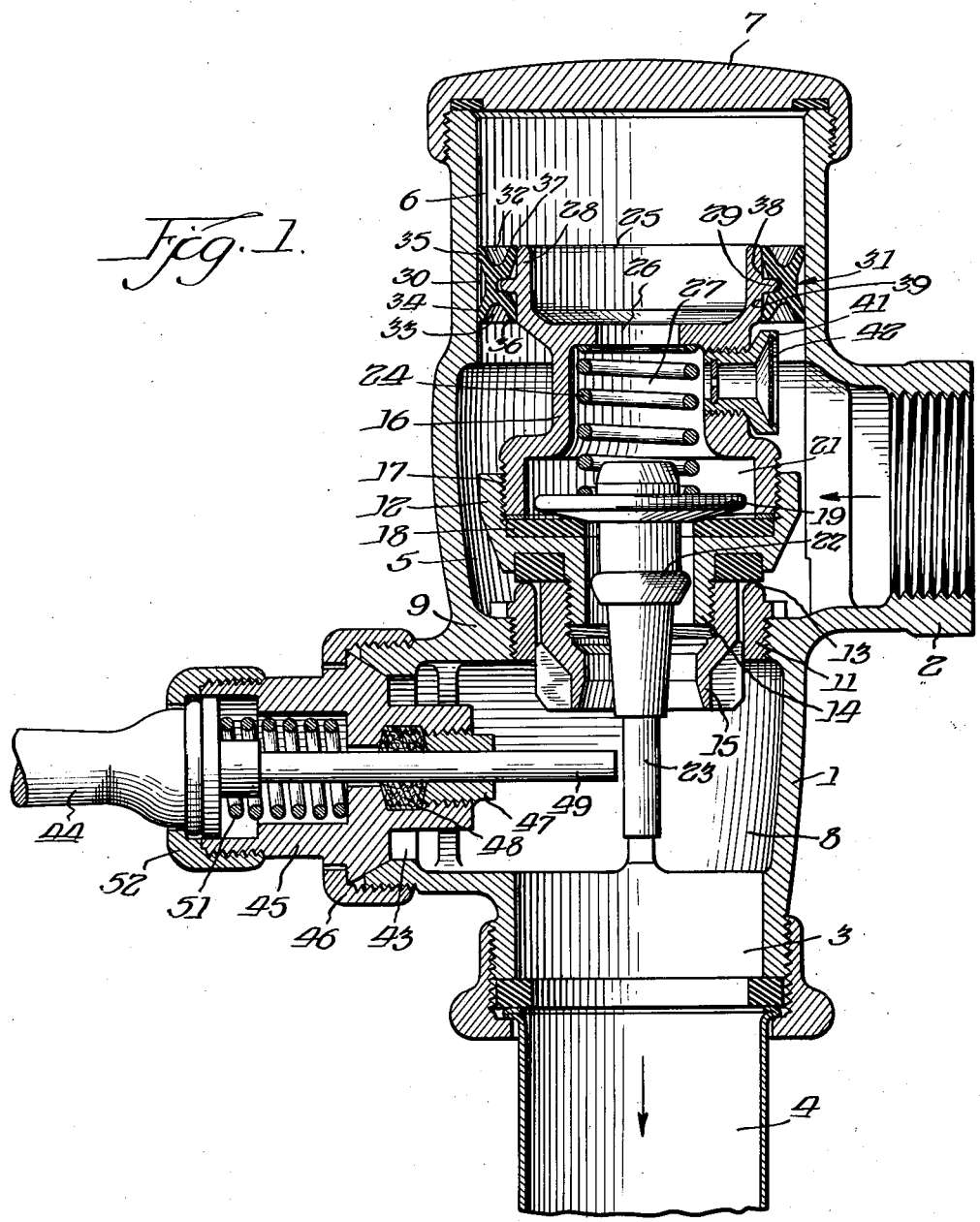

Patented May 24, 1949

2,470,925

UNITED STATES PATENT OFFICE 2,470,925

PISTON SEAL FOR FLUSH VALVES

Edward A. Fredrickson, Chicago, Ill., assignor to Crane Co., Chicago, Ill., a corporation of Illinois Application January 16, 1946, Serial No. 641,453

4 Claims. (Cl. 309—33)

This invention relates generally to a piston sealing means, and more particularly it is applicable to an improvement in the plunger mechanism in flush valves or the like normally used to control the flow of water to a closet bowl or similar type of plumbing fixture. Of course, as will hereinafter become more readily apparent, this invention may be applied to any device employing a plunger whereby fluid pressure may be employed to effect a seal having an unusually high degree of flexibility.

This invention may be used for example with the type of flush valve set forth in my U. S. Patent 2,369,104 entitled "Flush valve," patented February 6, 1945, and this reference is made only for purpose of illustration and not of limitation. As inspection of the patent referred to will indicate, heretofore in the attachment of the cup leather to the plunger mechanism of the valve, it has been the practice to use rather elaborate means of assembly for the plunger seal such as nuts, plates and screws, which was not only more expensive but also not as efficient as a seal nor possessing the flexibility of the current device.

Thus in addition to being more costly in actual manufacture and assembly, prior structures have lacked ease of removal and replacement.

These earlier structures further failed to have desirable flexibility, and it is therefore one of the primary objects of the instant invention to provide for such flexibility of the seal for expediting the easier alignment of the affected valve parts when the inaccuracies of such parts have made it desirable for the sealing means to possess increased flexibility.

Another important object is to provide a structure whereby the piston sealing means avoids the ordinary torsional strains present by being relatively free floating and responsive to transverse movement.

A further object is to provide for a piston sealing structure which is relatively cheap and simple to manufacture and assemble as a slip-on combination for example, and which requires no clamping or adhesive means to combine as a unit.

It should be understood in acquiring a better appreciation of the advantages of this contribution to the art, that the type of valves to which this invention is applied, and with which the applicant has had the most experience, is of an extremely critical structure. This applies both in manufacture and assembly as well as in its performance. Therefore this invention accomplishes a great deal in making a critical and unusually accurate operating device perform better, by making use of internal fluid pressures within the line or valve proper to improve the efficiency of the seal itself.

Other objects and advantages will become more readily apparent in connection with this invention upon proceeding with the following specifications read in light of the accompanying drawing, in which Fig. 1 is a sectional assembly view of a flush valve embodying my invention.

Fig. 2 is an enlarged fragmentary assembly view of a preferred form of the sealing structure.

Figs. 3 to 5 are modified forms of the invention.

Similar reference numerals refer to similar parts throughout the several views.

Directing attention now to Fig. 1, the main valve casing 1 is provided with the usual inlet and outlet passages 2 and 3 respectively, and which arrangement further provides for flow therethrough as indicated by the arrows, the inlet tube being connected generally to the usual stop valve (not shown). The discharge passage or outlet 3 leads by means of the conduit 4 to a plumbing fixture, such as a closet bowl or the like, to be flushed upon such actuation of the flushing valve as will hereinafter be described in greater detail. The valve body or casing 1 is provided with the usual valve chamber 5 having direct communication with the inlet passage 2 as indicated, the upper part of the valve chamber 5 being provided with the extended interior portion 6. The latter cylindrical chamber is preferably smoothly finished or bored and has for closing same the usual cap 7 threadedly or otherwise attached in sealing relation thereto as indicated. The lower portion of the valve casing 1 is provided with the discharge chamber 8 normally separated from the upper valve chamber 5 by the annularly extending diaphragm or bridge wall 9. The valve seat 11 may of course be made integral with the body 1 by merely extending inwardly the annular part 9 sufficiently as desired.

Occupying a substantial portion of the valve chamber 5, it will be apparent that the plunger assembly of the flush valve comprises both a main valve as well as an auxiliary valve as hereinafter referred to in more detail, and is so arranged that the main valve is normally held by fluid pressure in closed position, seating on the body seat ring 11 as indicated at 13. While a composition disc is indicated for use as the sealing contact for the main valve disc member 12, it is obvious that an integral metal-to-metal seal bearing contact may be employed if desired.

The lower portion of the main valve closure 12 is provided with the threaded shank 14 to which portion is attached the guide member 15 slidable fitting for reciprocable movement within the bore of the body seat ring 11 as indicated during the respective opening and closing operations of the valve.

As shown, the main valve closure member is preferably made hollow in its upper portion so as to thereby provide a chamber within which the center-piece 16 is threadedly positioned as at 17. Below the center-piece 16 and supported on the lower surface of the chamber of the main valve closure member 12, the auxiliary valve seat 18 is positioned. Normally seated upon the valve seat 18 the mushroom shaped auxiliary disc 19 is provided. The disc 19 cants or is tiltably movable within the main valve chamber 21, the auxiliary disc 19 and the stem 22 being hollow (not shown) to receive the telescoping rod member 23 and which is longitudinally movable therein in connection with the operation of the valve as described hereafter in more detail. This structural description however, does not constitute a part of the instant invention.

Continuing with a description of the upper portion of the valve and which is directly concerned with the current contribution, the auxiliary member 19 is normally maintained on its seat by means of a coiled spring 24, the latter member shouldering at the upper portion of the center-piece 16, the upper portion of the plunger being provided with the relieved head 25 apertured as at 26 and thereby being in communication with the spring chamber 27 of the center-piece 16.

Referring now more particularly to the novel construction of the plunger, the annular plunger portion 28 is suitably formed with an annular rib or flange 29 upon which the flexible ring generally designated 31 is mounted, preferably being sprung onto the rib 29 as shown more clearly in enlarged fragmentary section of Fig. 2. The ring 31 is provided at top and bottom with an annular groove 32 and 33, the effect of such groove being to provide by an annular bifurcation for the desired flexibility of the outer flanged portions of the ring designated 34 and 35 and also serving to increase the effectiveness of the seal provided by the inner annular flanged portions of the ring as designated at 36 and 37 respectively with the annular surface portions of the plunger at top and bottom, as indicated at 38 and 39. Thus when internal fluid pressure is applied in the lower chamber 5, the annular flange members 34 and 36 are expanded against the inner bore of the cylindrical chamber 6 and the plunger surface 39 respectively. When the pressure is applied in the upper chamber during normal valve operation, the pressure created within the annular groove 32 will tend to spread the flange 35 to contact the walls of the bore of the chamber 6 and also to increase the tightness or intimacy of the seal effected at 37 with the plunger surface 38. At a side portion of the spring chamber 27, a by-pass passage 41 is provided with the by-pass plate screen strainer 42.

Now for the purpose of describing the operation of the valve solely as an illustration of preferred application, attention is directed to the lower portion of the valve as shown in Fig. 1. The casing 1 is provided with the aperture 43 finished to provide the necessary means for journalling the tiltable actuating handle 44, the latter member being maintained in operating position by virtue of its journalling within the supporting member 45. The latter member is gripped in fluid-tight relation to the casing 1 by means of the threaded union ring 46, the member 45 being provided with a threaded bushing 47 in order to compress the stuffing box packing 48. This packing also serves to journal the handle at its separable reciprocably movable flanged rod portion 49, the spring 51 holding the handle 44 in abutting relation to the complementary end of the said handle while the complete assembly with the desired compression of the springs is obtained by means of a second union ring 52.

Proceeding further with a description of the device employing my invention, the tiltable handle 44 when depressed or pivotally moved, urges the separable rod portion 49 forward or inward against the compression of the spring 51. The movement of the member 49 continues forward until it strikes the telescopic rod member 23. Such latter movement causes the auxiliary valve disc 19 to be canted or tilted as to allow for the passage of flushing water therethrough. Upon such canting or tilting of the auxiliary valve from its seat, pressure in the valve chamber 6 will immediately be relieved. Since the area of the cylinder or chamber 6 is substantially greater than the area through the main valve seat as determined by the peripheral area of the annular seating portion 13 the water supply pressure within the valve chamber 5 causes the main valve 12 to move upwardly, leaving its seat 11. Opening the main valve carries with it the auxiliary valve 19 and the seat upwardly with it. Such latter movement of the main valve 12 causes the water within the cylindrical chamber 6 to move downward through the aperture or passage 26, thence into the lower chamber 27 and past the opening provided by the tilted auxiliary valve 19. The upward movement of the main valve closure member continues until by the distance travelled, it has caused the lowest end portion of the telescopic rod member 23 to reach a lifted position vertically whereby it has cleared the handle rod portion 49. Upon disengagement therefrom, the auxiliary valve 19 returns to its seat 18. At this stage of operation of the valve it is important to recognize that the motion of the main valve upwardly and downwardly is critical and therefore it is desirable that there be provided a degree of plunger flexibility in the entire main and auxiliary valve assembly which permits it to return accurately and unhampered to its seat. It is also very important that the fluid sealing in both directions around the peripheral inner wall of the cylindrical chamber 6 be obtained in a most efficient manner while still permitting such degree of flexibility as above described. Heretofore there existed the objection that there was not such sealing flexibility present and in many instances the lack of adequate sealing seriously impaired the action of the flush valve. By my novel sealing structure hereinabove described, the valve action is definitely improved and a minimum amount of wear occurs between cylinder wall and the flexible sealing member 31. At the same time in both opening and closing directions of the flush valve, the seal is easily and most effectively provided. Slight variations in centering, alignment or in dimensions between the chamber 6 and the seating structure of the lower portion of the casing do not constitute the serious objections as heretofore because the flexibility of the member 31 permits of relatively easy alignment as well as quick and convenient assembly on the plunger. The magnified view in Fig. 2 shows the sealing ring 31 when it is actually positioned or sprung into place on the plunger flange 29, and it will be apparent that it is preferable to allow for the outer edges of the annular portions 34 and 35 to project beyond the valley or annular relieved portion 30. It is also desirable to provide a narrow annular bearing at these locations and this is also applicable with relation to the inner peripheral portions of the sealing member 31 whereby the inside edges of the flanges 36 and 37 are enabled to make suitable sealing contact with the respective surfaces 38 and 39 of the annular flange 28 on the plunger of the valve. All of the latter elements are important considerations in proper plunger performance because pressure when applied in the annular valley portions 32 and 33 at the upper and lower ends respectively of the member 31 insure the type of contact which is most effective in maintaining such flexible seal. Attention is particularly directed to the fact that annular end bearing contacts are effected at locations designated 34, 35, 36 and 37, and that preferably an annular clearance at 10 is maintained between the sealing member and the plunger flange 29.

The details of such structural provisions for the sealing contact both in the outer and inner peripheral portions of the member 31 may be varied depending upon the nature of the construction of the plunger flange or rib 29, upon which the member 31 is mounted, and in the latter connection attention is directed to the modified forms of the latter construction shown and hereinafter to be described.

In Fig. 3 the flange 28 is shown as annularly relieved at 54 and 55 so as to provide for a substantial end bearing contact or narrow annular width at 56 and 57. Thus as in the construction described in Fig. 1 a clearance 10 is preferably provided beyond the outer periphery of the annular rib 29. The initial contact when assembled is therefore made at the upper and lower annular edge portions 56 and 57 respectively of the plunger 28. In this modification, the interposed or bifurcated annular pressure grooves 32 and 33 are equally essential in providing for the application of pressure against the inner surfaces of the cylinder 6 and also against the plunger surfaces 56 and 57.

In the modified structure shown in Fig. 4, the sealing member generally designated 31 is fitted relative to the plunger member 28 only at its lower portion insofar as the actual peripheral sealing contact is concerned. The flange member 58 defines the upper limits of the plunger 28, and the pressure groove 59 allows for the spreading of the lower depending flanges 61 and 62 at their respective outer and inner peripheries. The plunger member 28 is preferably relieved at its lower juncture with the annular rib 58 as indicated at 63, the pressure within the annular groove 59 being applied to the peripheral flange 62 of the sealing member and bears at least intially against the lower surface of the plunger as indicated at 64. The clearance as indicated at 10 is preferably provided in this modified structure as in the other described figures. It serves the same function in providing a degree of desirable flexibility which permits sealing without objectionable interference during the course of movement of the plunger 28 to and from the open and closed positions of the valve, particularly insofar as the alignment previously referred to is concerned. The upper groove 65 may or may not be provided. Its selection will depend upon the type of materials employed, the size of the valve and the service for which it is intended.

In a further modified form of the structure, as shown in Fig. 5, the sealing member 31 is mounted upon the annular flange 66 with the lower portion thereof having a clearance as indicated at 67 to provide for a pressure sealing contact with the upper periphery of the plunger 28 as indicated at 68, the annular pressure groove 69 providing the necessary sealing application against the interior wall of the cylinder 6 of the casing 1 and also against the surface 68 as shown. The usual clearance 10 between the flange 66 and the inside portion of the member 31 is indicated for permitting the desired transverse flexibility.

It is not the desire to be limited to the precise constructions, arrangement and operation of parts as hereinabove shown and described. It is manifest that numerous variations of modifications in the detailed structure and arrangement of the plunger sealing means may be employed, and the article may be adapted for use in various services, positions and connections, without departing from the scope of my invention. Reservation of the right is therefore made to all such variations and modifications as properly fall within the scope of my improvements and the terms of the following claims.

I claim:

1. In a piston construction, the combination of a plunger within a cylinder having a substantially cylindrical portion with a circumferential flange extending from said cylindrical portion, a removable flexible sealing member mounted upon said flange, the said sealing member having an annular relieved end portion whereby pressure within said relieved portion tends to spread the latter relieved portion apart, whereby peripheral contacts are made by said flexible sealing member with the said piston and said cylinder simultaneously, the said sealing member having annular clearances between said sealing member and the cylinder and between the sealing member and the plunger whereby said sealing member and said plunger are transversely movable predeterminedly, the annular clearance between the said sealing member and plunger being substantially increased immediately adjacent the inner rim-portion of the said circumferential flange.

2. In a piston construction, a plunger having an annular flange, a flexible sealing member movable within a cylinder removably mounted upon said annular flange, at least one end portion of the said sealing member being of annular bifurcated form whereby pressure exerted spreads the sealing member against an annular portion of the said plunger removed from the flange and outwardly in said cylinder within limits defined by the said cylinder, the said sealing member being transversely movable relative to the said plunger and cylinder in a plane substantially at right angles to its axis, the said plunger providing an annular relieved portion on both sides of the annular flange.

3. In a piston construction, a plunger having an annular flange, a flexible sealing member movable within a cylinder removably mounted upon said annular flange, at least one end portion of the said sealing member being of annular bifurcated form whereby fluid pressure exerted spreads end annular portions of the sealing member against an annular portion of the said plunger removed from the annular flange and outwardly in said cylinder within limits defined by the said cylinder, annular clearances being in a plurality of planes and provided respectively between said sealing member and said plunger and between the said sealing member and the inner walls of the cylinder, the said clearances being removed from the end portions of said sealing member whereby centrally located inner and outer annular portions of the said sealing member may be moved transversely relative to the said annular flange.

4. In a plunger sealing structure, the combination including a plunger movable along a vertical axis within a cylinder, sealing means mounted on said plunger, the latter comprising a packing member removably mounted upon the said plunger, supporting means on the plunger for the said packing member providing that the said packing member is transversely movable relative to the said plunger and cylinder in a plane substantially at right angles to the vertical axis, the packing member being annularly relieved to form a substantially U-section at at least one end portion, whereby when fluid pressure is applied to the annularly relieved portion of the said packing member an inner annular portion of said packing contacts an annular portion of the said piston and an outer annular portion of the said packing member contacts a peripheral wall of the cylinder, annular clearances in a plurality of planes between the packing member and the plunger and between the packing member and the cylinder whereby the mounting of the said sealing means upon said supporting means provides for said limited movement of the packing member transversely relative to the supporting means.

EDWARD A. FREDRICKSON.

REFERENCES CITED

The following references are of record in the file of this patent:

UNITED STATES PATENTS

| Number | Name | Date |
|---|---|---|
| 1,828,056 | Lamb | Oct. 20, 1931 |
| 2,047,120 | Stout | July 7, 1936 |
| 2,214,261 | Roth | Sept. 10, 1940 |
| 2,216,505 | Thornhill | Oct. 1, 1940 |
| 2,340,466 | Gosling | Feb. 1, 1944 |